United States Patent [19]
Kovac

[11] Patent Number: 5,168,971
[45] Date of Patent: Dec. 8, 1992

[54] TRANSMISSION CLUTCH FOR A MOTOR VEHICLE HAVING A DYNAMIC ABSORBER

[75] Inventor: Josip Kovac, Ozoir-la-Ferriere, France

[73] Assignee: Valeo, Paris, France

[21] Appl. No.: 788,924

[22] Filed: Nov. 7, 1991

[30] Foreign Application Priority Data

Nov. 8, 1990 [FR] France ............................. 90 13861

[51] Int. Cl.[5] .......................................... F16D 3/14
[52] U.S. Cl. ............................. 192/30 V; 192/70.17; 192/106.1
[58] Field of Search ............... 192/30 V, 70.17, 70.18, 192/106.1

[56] References Cited

U.S. PATENT DOCUMENTS

| | | | |
|---|---|---|---|
| 4,842,116 | 6/1989 | Fukushima | 192/106.2 |
| 4,844,224 | 7/1989 | Fukushima | 192/70.17 |
| 4,844,225 | 7/1989 | Fukushima | 192/70.17 |
| 4,846,323 | 7/1989 | Fukushima | 192/70.17 X |

FOREIGN PATENT DOCUMENTS

| | | |
|---|---|---|
| 2619536 | 11/1977 | Fed. Rep. of Germany . |
| 3643272 | 6/1988 | Fed. Rep. of Germany . |
| 2616184 | 12/1988 | France . |
| 63-246529 | 10/1988 | Japan . |
| 63-251644 | 10/1988 | Japan . |
| 2186054 | 8/1987 | United Kingdom ............. 192/70.17 |

*Primary Examiner*—Leslie A. Braun
*Assistant Examiner*—Nicholas Whitelaw
*Attorney, Agent, or Firm*—Longacre & White

[57] ABSTRACT

A transmission clutch, for releasably coupling a driven shaft to a driving shaft, comprising a driving part and a driven part, with the driving part including a reaction plate while the driven part includes a hub which is fixed to the driven shaft for rotation of the latter therewith. A dynamic vibration damper (dynamic absorber) is carried by the hub and includes a secondary plate and a radial support plate, which is secured to the hub and which carries a friction liner for frictional cooperation with the secondary plate. The radial support member is coupled to the hub both axially and in rotation, and carries a block of resilient material which is fixed to the friction liner, being interposed between the latter and the radial support member.

3 Claims, 2 Drawing Sheets

TRANSMISSION CLUTCH FOR A MOTOR VEHICLE HAVING A DYNAMIC ABSORBER

FIELD OF THE INVENTION

The present invention relates to transmission clutches, in particular for motor vehicles, and comprising a driving part adapted to be coupled in rotation to a driving shaft, together with a driven part which is adapted to be coupled in rotation to a driven shaft, with the said driving part comprising a reaction plate and a pressure plate, the pressure plate being firstly movable axially with respect to the reaction plate while being coupled in rotation to the latter, and secondly, being subjected to the action of resilient means bearing on a cover member which is fixed with respect to the reaction plate, while the driven part of the clutch comprises a friction liner support member carrying first friction liner means adapted to be gripped between the said reaction plate and pressure plate for transmission of rotary motion from the driving shaft to the driven shaft, the said support member being coupled to a hub which is fixed to the driven shaft for rotation with the latter, and the clutch further including a dynamic vibration damper (dynamic absorber), which is fixedly carried by the hub and which includes a secondary plate coaxially mounted for rotation with respect to the reaction plate through a bearing, together with a radial support member which is attached to the hub and which carries second friction liner means for cooperation with the secondary plate.

BACKGROUND OF THE INVENTION

Such a dynamic vibration absorber is described in the specification of U.S. Pat. No. 4,842,116, and is so dimensioned that it is effective in a frequency range in the region of a resonant frequency the value of which depends on the particular application to which the clutch is to be put. In the above mentioned U.S. patent specification, the radial support member is fixed on an auxiliary hub which is splined for cooperation with a splined surface provided on the main hub. This auxiliary hub is subjected to the action of a resilient means which bears on the main hub. In addition, in order to provide fully effective damping, a torsion damper is provided which acts between the reaction plate and the secondary plate. All of this complicates the manufacture of the clutch, and increases the number of components in the clutch. In addition, the splined mounting of the auxiliary hub is subject to a danger of jamming, which is detrimental to the performance of the clutch.

DISCUSSION OF THE INVENTION

An object of the present invention is to overcome these drawbacks, and thus to provide in a simple and economic manner a novel dynamic vibration damper or dynamic absorber having a radial support member which is carried by the hub, with the number of components being reduced but without restricting its performance.

In accordance with the invention, a clutch of the type defined in the section "Field of the Invention" above is characierised in that the radial support member is coupled to the hub both axially and in rotation, and carries a block of resilient material which is fixed to the second friction liner means and which is interposed between the latter and the radial support member.

The block of resilient material which is provided in accordance with the invention has a double function, namely, firstly, that of an axially acting resilient means for causing the second friction liner means to be gripped in contact with the secondary plate when the clutch is engaged, and secondly the function of a circumferentially acting resilient means. This block of resilient material thus replaces the springs of the torsion damper featured in the prior art clutches, acting between the reaction plate and the secondary plate, as well as the resilient means that acts between the main and auxiliary hubs. It will be appreciated that the radial support member follows the movement of the hub, and therefore that the response time for disengaging the second friction liner means from its secondary plate is reduced. This is an especially valuable feature during rapid shifts in the gears of the vehicle.

In addition, all of the components of the clutch according to the invention are of simple shapes. The invention reduces the number of components necessary, without prejudice to damping performance.

The description that follows of a preferred embodiment of the invention is given by way of example only and with reference to the accompanying drawings.

DESCRIPTION OF A PREFERRED EMBODIMENT OF THE INVENTION

Figure 1:
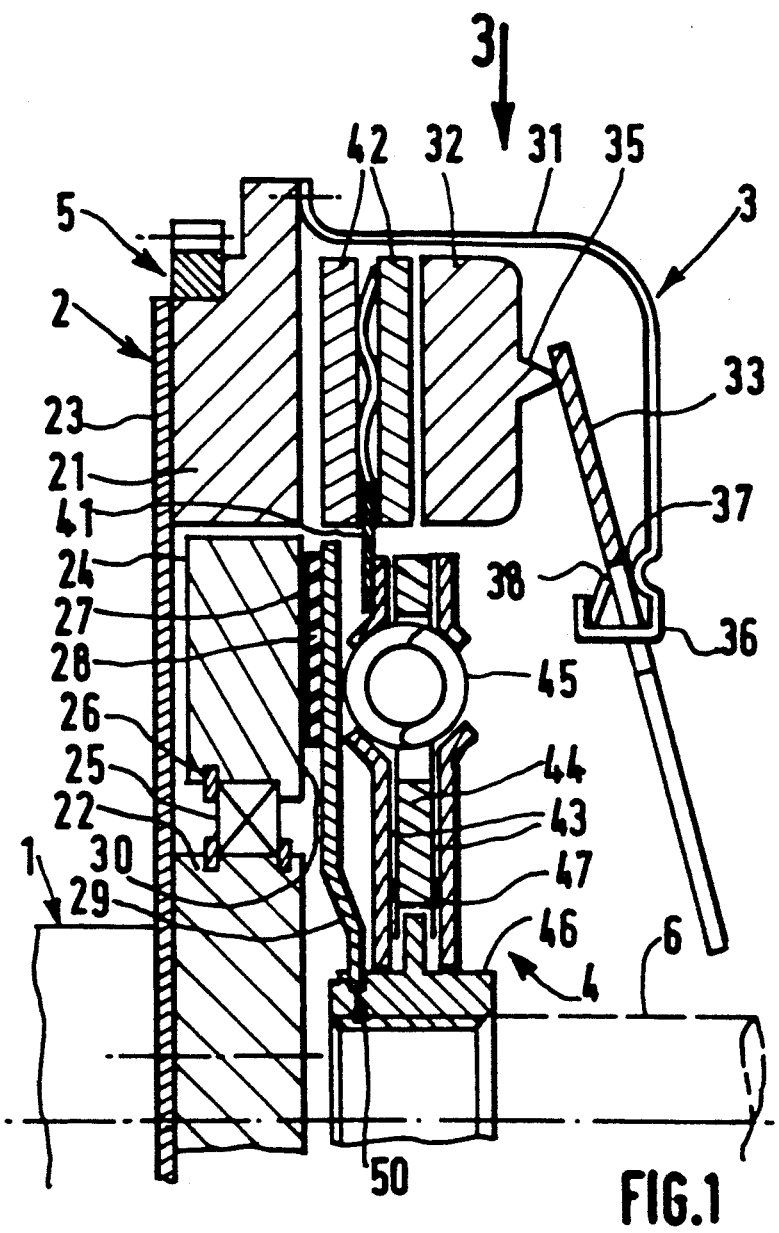
FIG. 1 is a view in axial cross section showing one half of the clutch in accordance with the invention.
Figure 2:
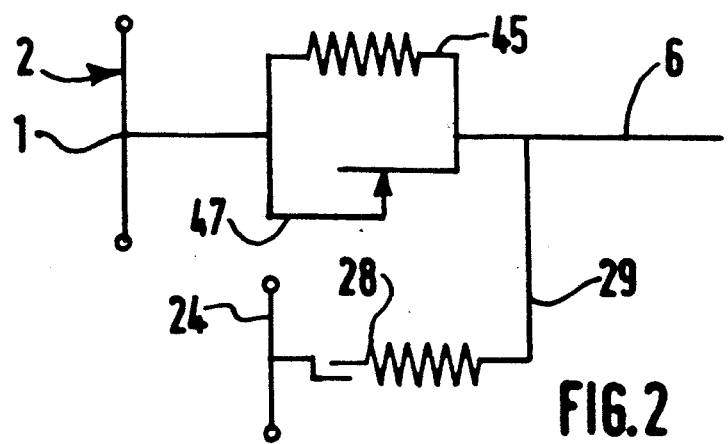
FIG. 2 is a functional diagram representing the structure seen in 1.

In the embodiment shown in the drawings, the clutch, for the transmission of a motor vehicle, comprises a driving part 2, 3 which is coupled in rotation to the crankshaft 1 of the internal combustion engine of the vehicle. The crankshaft 1 is a driving shaft. The clutch also has a driven part 4 which is coupled in rotation to a driven shaft 6, which in this example is the input shaft of the gearbox of the vehicle. The driving part includes a reaction plate 2 which is secured to the crankshaft 1, and a clutch mechanism 3. The clutch mechanism 3 comprises a cover member 31, a pressure plate 32, and a diaphragm 33, all these components being annular in shape. The cover member 31 is in the form of a hollow dish having a radial flange for securing the clutch mechanism to the reaction plate 2, and a base portion which is open in the centre and joined to the radial flange through a peripheral skirt portion.

Figure 3:
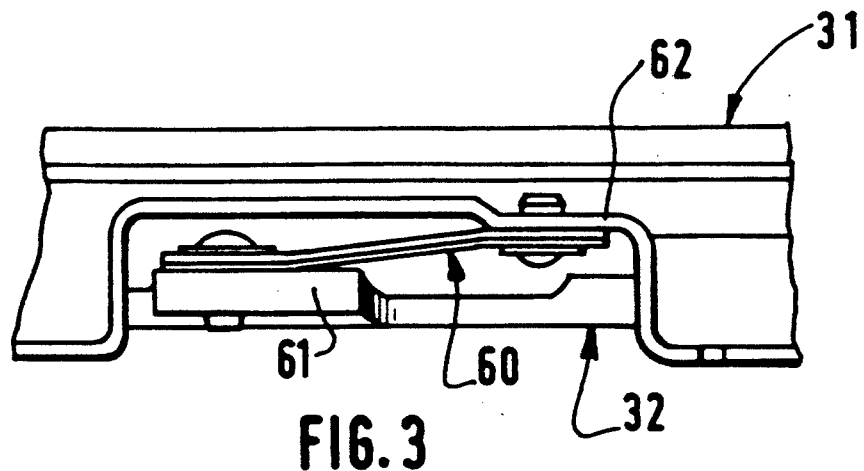
FIG. 3 is a partial view taken on the arrow 3 in FIG. 1.

The pressure plate 32 is movable axially with respect to the cover member 31, to which it is coupled in rotation. This rotational coupling may for example comprise a coupling of the tenon and mortice type, with radial tenons of the pressure plate 32 engaged in grooves formed in the skirt portion of the cover member. Alternatively, it may consist of tangential tongues 60, FIG. 3, which extend in a known manner from a radial lug 61 formed on the pressure plate to a fastening zone 62 that is part of the securing flange of the cover member 31. The skirt portion of the latter is then slotted to allow the lugs 61 to pass through them, as is seen in FIG. 3. In this example, the tongues 60 are secured by riveting.

The diaphragm 33 is, in this example, mounted so as to be able to tilt on the cover member 31, in order to urge the pressure plate 32 towards the reaction plate 2. This tilting mounting is effected by means of lugs 36 projecting from the base portion of the cover member 1 and extending through apertures formed in the diaphragm 33. The lugs 36 are turned outwardly at their free ends, away from the axis of the assembly, in order to retain in position a crown ring 38 which affords a secondary engagement surface for the diaphragm 33, and which faces towards a primary engagement surface 37 carried by the base portion of the cover member 31. In this example the primary engagement surface 37 comprises a pressed-in bead formed in the base portion of the cover member.

In greater detail, the diaphragm 33 bears through the inner periphery of its Belleville ring portion on the primary engagement surface 37, and through the outer periphery of its Belleville ring portion on an intermittent, annular projecting rib 35 formed on the pressure plate 32.

The driven part 4 of the clutch comprises a friction pad support plate 41 carrying first friction liner means in the form of annular friction pads 42, which may extend continuously or intermittently, and which are adapted to be gripped between the pressure plate 32 and the reaction plate 2 in order to transmit the rotary motion of the driving shaft 1 to the driven shaft 6. The friction pads 42 extend on either side of the support 41, the latter also being annular, and they are of course secured to it. The support plate 41 is resiliently deformable, so as to grip the friction pads 42 progressively, and in this example the plate 41 is corrugated to achieve this progressive action. The support plate 41 is coupled to a hub 46, which is fixed to the gearbox input shaft 6 for rotation of the latter with it. To this end, the hub 46 has a splined internal bore for sliding along the input shaft 6, which is correspondingly splined.

Figure 4:
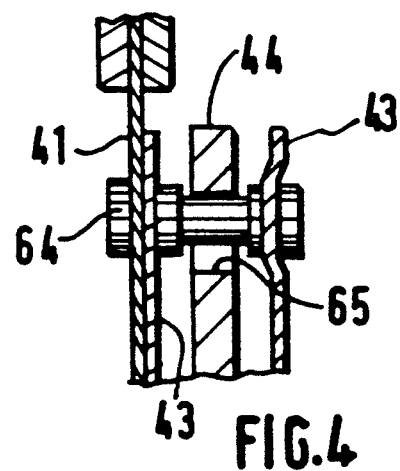
FIG. 4, is a scrap elevation in cross section, showing how the guide rings of the torsion damper of the clutch are coupled together.

In this example the support plate 41 is coupled to the hub 46 through a torsion damper. In a known manner, this damper comprises two guide rings 43 which are arranged on either side of a damper plate 44. The guide rings 43 are coupled together by means of spacers 64 (see FIG. 4) which extend through slots 65 formed for this purpose in the damper plate 44. The support plate 41 is secured to one of the guide rings 43. These guide rings 43 are formed with windows which are aligned with windows formed in the damper plate 44, and circumferentially acting resilient means, which in this example consist of coil springs, are mounted in these windows so as to act between the damper plate and the guide rings.

In a modification not shown, the guide rings 43 may be fixed with respect to the hub 46 by force fitting or riveting, while the friction pad support plate 41 is secured by riveting to the damper plate 44, the latter being mounted for free rotation about the hub 46.

Friction means 47 are also provided, so as to act between the damper plate 44 and the guide rings 43. These friction means, again in a known manner, include at least one friction ring which is interposed axially between one of the guide rings 43 and the damper plate 44, and an axially acting resilient means which bears on the other guide ring 43, so as to urge the damper plate 44 towards the friction ring whereby to grip the latter.

Figure 5:
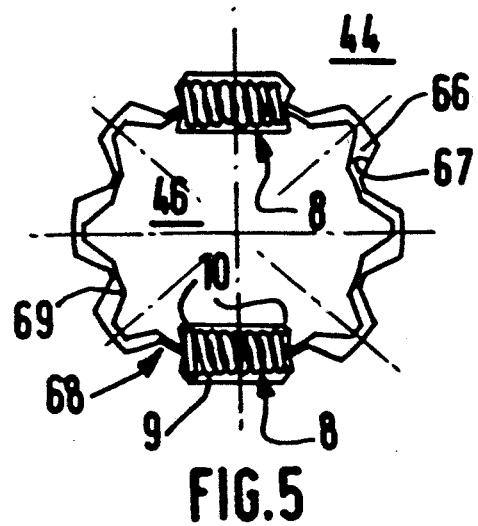
FIG. 5 is a scrap view showing the coupling between the hub and the torsion damper.

In this particular example, the damper plate 44 is mounted on the hub 46 through a loose coupling means which is best seen in FIG. 5. This is in the form of two sets of teeth, one on the hub and one on the damper plate, which engage with each other with a circumferential clearance between them. As can be seen in FIG. 6, the teeth 66 of the hub 46 penetrate into slots 67 formed in the damper plate 44 between the teeth 68 of the latter, which similarly penetrate into slots 69 defined between the teeth 66 of the hub, there being a circumferential clearance between each tooth and the slot which it engages in the other component. In addition, two springs 8 of low stiffness are mounted, through end thrust inserts 10, in slots 9 which are formed in the damper plate 44 and the hub 46.

In operation of the clutch mechanism, the damper plate 44 is initially displaced in known manner with respect to the hub 46, against the action of the springs 8, the stiffness of which is substantially smaller than that of the springs 45. In the next step of the operation, the springs 45 are compressed, with the guide rings 43 being displaced circumferentially with respect to the damper plate 44. It will of course be understood that the damper plate 44 may alternatively be arranged to be fixed to the hub 46, on which it is then secured by suitable deformation.

The reaction plate 2 includes a radial support plate 23 which is carried on the crankshaft 1 and secured to the latter by means of fasteners such as screws (not shown).

The reaction plate further includes a working member 21, constituting the reaction plate proper, which is arranged to cooperate frictionally with the friction pads 42, and an inner support plate 22 which is secured to the crankshaft 1. In this example, the reaction plate member 21 is secured to the radial support plate 23 by means of threaded fasteners, as is the inner support plate 22, with the said threaded fasteners serving to secure both the inner support plate 22 and the radial support plate 23 to the crankshaft 1. It is of course possible alternatively to use rivets or any other suitable fastening means.

The reaction plate member 21 carries the starting crown 5 which is arranged to cooperate with the starter motor of the vehicle. The member 21 also carries the cover member 31, the securing flange of the latter being fastened to the working member 21. This last mentioned fastening may be in the form of threaded fasteners as in this example, or alternatively it may be effected by riveting. The inner support plate 22 carries a bearing 25, which in this example is in the form of a ball bearing but which may be an antifriction bearing. The bearing 25 is interposed radially between the support plate 22 and a secondary plate 24, which is accordingly mounted coaxially and for rotation with respect to the support plate 22 and therefore the reaction plate as a whole. The secondary plate 24 extends radially inwardly of the reaction plate member 21, and is axially aligned with both the member 21 and the inner support plate 22.

In this embodiment, the secondary plate 24 has a shoulder for axially locating the bearing 25, and three circlips 26 are provided for the axial location of the inner and outer rings of the bearing 25 in known manner. The circlips 26 are mounted in grooves formed respectively in the plates 22 and 24.

The clutch also includes a dynamic vibration damper (dynamic absorber) having a radial member 29 and a second friction liner means in the form of an annular friction liner 27. The latter may be in the form of a plurality of separate friction pads. It cooperates with the secondary plate 24.

The radial member 29 is secured both axially and in rotation to the hub 46, and carries a block 28 of resilient material which is fixed to the friction liner 27, being interposed between the latter and the radial member 29. In this embodiment, the secondary plate 24 has an annular friction surface 30 which is directed away from the working member 21 of the reaction plate, so as to make contact with the friction liner 27.

The radial member 29 is gripped on the hub 26 in the vicinity of the inner support plate 22, and extends, as does the secondary plate 24, radially inwardly of the friction pads 42. In this example, the radial support member 29 is provided with teeth on its inner periphery, these teeth being of a harder material than the hub 46. The hub 46 has a shoulder 50, and the radial member 29 is force-fitted into the outer periphery of the hub. During this operation, it cuts grooves until it comes into contact with the shoulder on the hub, being located axially between the shoulder 50 of the hub and an integral fold which is formed at the end of the operation of fitting the radial member 29. In this example, the profile of the inner periphery of the latter enables the friction liner 27 to be offset axially with respect to the hub 46, and it also has some degree of elasticity.

In a modification, the radial member 29 may be secured by means of screws on one of the end faces of the hub 46. In a further modification, the radial member 29 is welded to the hub 46.

The apparatus operates in the following way. When the clutch is engaged, the friction pads 42 are gripped between the reaction plate 21 and the pressure plate 32, and rotary motion is transmitted from the driving shaft 1 to the driven shaft 6, the friction liner 27 being in frictional contact with the surface 30 and being biassed axially into contact with this surface by the block of resilient material 28. The dynamic vibration damper is then effective at a predetermined frequency.

When the clutch is disengaged, the friction pads 42 are released, with a clearance then existing between the pads 42 and the two clutch plates 21 and 32. Similarly, the friction liner 27 is also disengaged, with a clearance then existing between it and the surface 30.

It will be recalled that the clutch is normally in its engaged position under the action of the diaphragm, and that, in order to disengage the clutch, it is only necessary to cause a clutch release bearing to exert a thrust on the ends of the fingers of the diaphragm, in order that the latter shall pivot between the two engagement points 37 and 38. The dynamic vibration damper 28, 27, 24 thus acts when the clutch is engaged, while, when the clutch is disengaged, only a small inertia is effective on the gearbox. This is an advantage, particularly in the case of a rapid gear shifting operation.

It will be appreciated that the radial member 29, with its friction liner 27 and resilient block 28, follows the movement of the hub 46, the latter being displaced by means of its splines along the shaft 6 when the clutch changes from its engaged position to its disengaged position. In the engaged position the hub 46 is fixed. It will be realised that the radial member 29 and the hub 46 together constitute a kind of pressure plate, while the secondary plate 24 similarly constitutes a reaction plate, with the block 28 of resilient material exerting an axial return force in combination with the friction pad support plate 41, permitting the hub 46 to slide.

The dynamic vibration damper is dimensioned appropriately to each particular application, and thus according to the characteristics of the engine of the vehicle and the vibrations which it generates, in such a way that the damper acts at frequencies in a range that includes the resonant frequency when the clutch is engaged. This damper absorbs the vibrations in the classic manner of a dynamic absorber, and the dimensions of the plate 24, and in particular its mass, are chosen accordingly.

It will be appreciated that the apparatus is compact and that the block of resilient material 28 also has a damping function, since besides its axial return function acting on the hub 46 so as to space the latter away from the secondary plate 24, the block 28 also has a circumferential action so that it constitutes a circumferentially acting resilient means. The block 28 may if desired be divided into a plurality of elements, secured, for example adhesively, to the friction liner 27 and to the radial member 29. In a modification, it may be adhesively secured to these elements by, for example, in situ vulcanisation. The block 28 may for example be of an elastomeric material such as rubber, or a silicone based material.

The present invention is of course not limited to the embodiment described above. For example, the clutch may be of the "pull off" type, with the diaphragm 33 then bearing through the outer periphery of its Belleville ring on the cover member 31, and through the inner periphery of the Belleville ring on the plate 32. Disengagement of the clutch is then effected by traction. Similarly, instead of a diaphragm 33, a plurality of helical springs may be provided in combination with declutching levers.

What is claimed is:

1. A transmission clutch for releasably coupling a driving shaft rotatably to a driven shaft, the clutch comprising a driving part secured to a said driving shaft for rotation with the driving shaft and a driven part secured to said driven shaft for rotation with the driven shaft, the driving part comprising a reaction plate, a pressure plate, means mounting the pressure plate for rotation with the reaction plate and for axial movement with respect to the reaction plate, a cover member secured to the reaction plate, and resilient means bearing on the cover plate and acting on the pressure plate, said driven part of the clutch comprising a friction pad support member, first friction liner means carried by said friction pad support member so as to be gripped between said pressure and reaction plates whereby to transmit motion from the driving shaft to the driven shaft, a hub adapted to be secured in rotation on the driven shaft, and means coupling the friction pad support member to the hub, wherein the clutch further includes a dynamic vibration damper carried by the hub and comprising a secondary plate, a bearing mounting said secondary plate coaxially with respect to the reaction plate for rotation with the latter, a radial support member carried by the hub and secured thereto both axially and in rotation, and second friction liner means carried by the radial support member for frictional cooperation with the secondary plate, the clutch further including a block of resilient material interposed between, and secured to, the radial support member and the second friction liner means.

2. A clutch according to claim 1, wherein the radial support means is secured on the hub by forced insertion therein.

3. A clutch according to claim 1, wherein the radial support member has at its inner periphery a serpentine profile.

* * * * *